United States Patent
Elieson et al.

(10) Patent No.: US 10,558,693 B1
(45) Date of Patent: Feb. 11, 2020

(54) CONVERSATIONAL BOT TO NAVIGATE UPWARDS IN THE FUNNEL

(71) Applicant: Amazon Technologies, Inc., Seattle, WA (US)

(72) Inventors: Brian Elieson, Seattle, WA (US); Karthik Krishnamurthy, Bellevue, WA (US); Aneeb Naveed Qureshi, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 305 days.

(21) Appl. No.: 15/451,161

(22) Filed: Mar. 6, 2017

(51) Int. Cl.
*G06F 17/30* (2006.01)
*G06F 16/33* (2019.01)
*G06F 16/84* (2019.01)
*G06F 16/332* (2019.01)
*G06F 16/9535* (2019.01)

(52) U.S. Cl.
CPC ........ *G06F 16/334* (2019.01); *G06F 16/3329* (2019.01); *G06F 16/84* (2019.01); *G06F 16/9535* (2019.01)

(58) Field of Classification Search
CPC ... G06F 16/9535; G06F 16/335; G06F 16/435
See application file for complete search history.

(56) References Cited

U.S. PATENT DOCUMENTS

| | | | | |
|---|---|---|---|---|
| 2013/0226925 | A1* | 8/2013 | Carbonell | G06F 16/345 707/740 |
| 2015/0026155 | A1* | 1/2015 | Martin | G06Q 30/06 707/722 |
| 2015/0364057 | A1* | 12/2015 | Catani | G09B 19/0092 434/127 |
| 2015/0378975 | A1 | 12/2015 | Wu et al. | |
| 2016/0350336 | A1* | 12/2016 | Checka | G06K 9/6215 |

OTHER PUBLICATIONS

U.S. Appl. No. 14/866,694, filed Sep. 25, 2015, Titled: Extracting Product Facets From Unstructured Data.

* cited by examiner

*Primary Examiner* — Hung Q Pham
(74) *Attorney, Agent, or Firm* — Kilpatrick Townsend & Stockton LLP

(57) ABSTRACT

Described herein are a system and methods for providing relevant search results to a user using an automated user assistant to update filters used as search parameters. In some embodiments, an automated user assistant may initiate a conversation with a user detected interacting with an item. The user may provide feedback that indicates one or more attributes relevant to the user's interests with respect to the currently viewed item. In some embodiments, the user may also provide an indication of how values associated with those attributes would be made more relevant to the user. Various filters associated with the attributes may be updated based on the received user feedback. The updated filters may then be provided as search parameters to a search engine. A set of search results returned by the search engine may be provided to the user.

17 Claims, 8 Drawing Sheets

CONVERSATIONAL BOT TO NAVIGATE UPWARDS IN THE FUNNEL

BACKGROUND

With the growing popularity of online shopping, many electronic retailers are finding it difficult to effectively present relevant items to consumers. This is especially true for electronic retailers that manage an electronic catalog that includes a large number of items with a variety of attributes. It is possible to narrow down a list of relevant items by asking a user for values to be associated with each possible attribute for an item and then searching on those values. However, providing this level of detail can be frustrating to a consumer, who may choose to shop elsewhere instead.

Search engine results may be presented in a "funnel" format, wherein fewer results are presented to a user as filters associated with the search are narrowed. Users may be moved upward in the funnel by relaxing filters (e.g., widening a range associated with the filter) and users may be moved downward in the funnel by tightening filters (e.g., narrowing or otherwise restricting a range associated with the filter). Typically, users start at the top of the funnel and make their way down. For example, a user may start with a very broad search and provide more and more requirements until they've found the item that best fits their needs. However, this is often time consuming and may be frustrating to the user. Additionally, the use of this sort of search format can quickly narrow to a sub-optimal result. There is a need for an intuitive way for a user to traverse back up the funnel without having to start back at the top of the search funnel.

BRIEF DESCRIPTION OF THE DRAWINGS

Various embodiments in accordance with the present disclosure will be described with reference to the drawings, in which.

DETAILED DESCRIPTION

Figure 1:
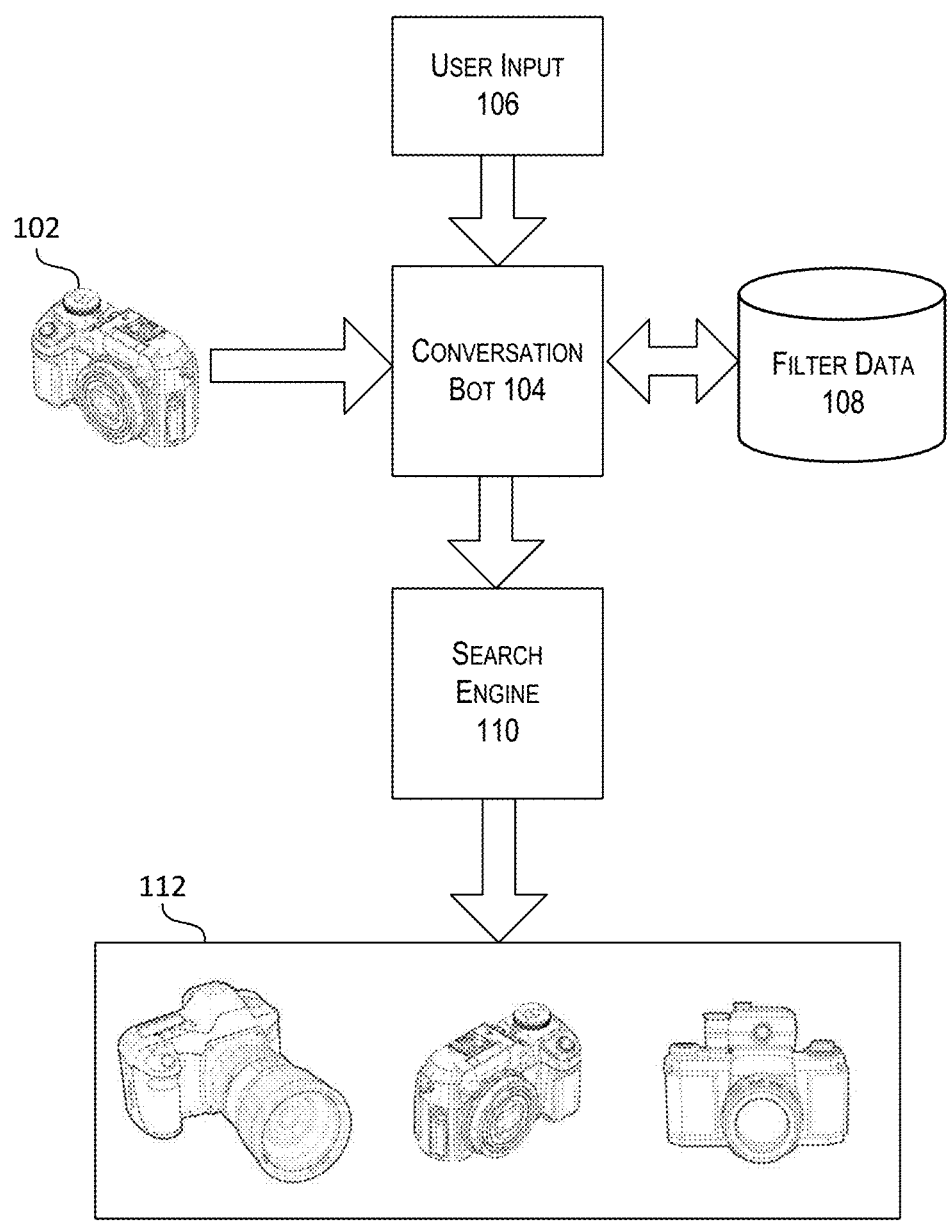
FIG. 1 depicts a high-level illustration of an example interaction with the described system in accordance with embodiments of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the disclosure are directed to a system in which users may be provided with more accurate search results for items in an electronic catalog. In some embodiments, users that express disinterest in an item that they are currently interacting with may be engaged by an automated user assistant (e.g., a conversation bot) in order to identify attributes of the item that are undesirable to those users. In response, the users may provide feedback to the automated user assistant in a number of ways, including by providing unstructured text. The provided feedback is then processed to identify one or more attributes of the item currently being interacted with, as well as filters associated with those attributes. A set of filters in then generated that reflects the feedback. The set of filters is then applied to search results of a search engine to identify a number of items that may be more desirable to the users based on their feedback.

A search funnel may be any suitable search result format presentation in which users are able to refine search results through the use of various filters. In some embodiments, a funnel may be represented by a series of search results, wherein each successive set of results (moving downward in the funnel) includes less results than the previous search. In a search funnel, presentation of a single item, or relatively small number of items, (where all filters are completely tightened) may correspond to a bottom of the search funnel whereas presentation of the catalog of items (where all filters are completely relaxed) may correspond to the top of the search funnel. Embodiments of the current disclosure focus on a system configured to identify appropriate changes to various filters in order to move a user upward in a search funnel while maintaining certain other filters. These embodiments enable a user to select an item, describe the features of that item that the user likes or does not like, identify filters associated with the described features, and navigate the user upward in the funnel by relaxing appropriate filters. In this way, users are navigated upward in the funnel with respect to the features that the user doesn't like while maintaining filters associated with the features that the user does like. This, in turn, provides more relevant search results to the user while requiring optimal (e.g., minimal) input from that user.

By way of illustrative example, consider a scenario in which a user is viewing coffee makers on an electronic retailer's website. In this example, the user may be viewing webpage associated with a particular coffee maker. Upon detecting that the user has been viewing the webpage for over a predetermined amount of time, the user may be engaged by the conversation bot. In this example, the user may be asked "what do you not like about this coffee maker?" The user may reply "it's too expensive." Upon receiving this response, the system may determine that the relevant attribute is price and the currently-viewed coffee maker is associated with a filter of a prices range of $125-$150. The system may then determine that a filter indicating a price range of $100-$125 should be applied. A new set of filters may be generated that includes each of the filters currently applied to the currently viewed coffee maker, with the filter related to price being updated. The set of filters is then provided to a search engine on the electronic retailer's site to identify a number of other coffee makers that are similar to the currently viewed coffee maker, though less expensive.

FIG. 1 depicts a high-level illustration of an example interaction with the described system in accordance with embodiments of the disclosure. In FIG. 1, a user may be detected as interacting with an item 102. In some embodiments, interacting with an item may comprise an interaction with a representation of that item. For example, the interaction with an item 102 may comprise an interaction with a digital catalog entry for that item within an electronic catalog. During this interaction, the system may receive an indication that the user is disinterested in the item 102. Disinterest may comprise any indication that the item may not be what the user is looking for or that the user would like to consider other options. For example, a user may be interested in a particular type of item, but may not be interested in a specific item of that type that he or she is currently interacting with. This may be detected if the user removes the item from a virtual shopping cart, peruses negative reviews associated with the item, or views a website associated with the item for an amount of time greater than a threshold amount of time. Upon receiving this indication, a conversation bot 104 implemented by the system may obtain user input 106 from the user indicating aspects of the item 102 that are undesirable. The system may then compare the received user input to various filters relevant to the item 102 in filter data 108. Based on this comparison, one or more filters of filter data 108 may be updated. The system may then communicate an updated set of filters to a search engine 110 in order to identify a new set of items 112.

In some embodiments, the item 102 may comprise an item in an electronic catalog. In an electronic catalog, catalog entries (e.g., goods or services offered for sale by an electronic retailer) may be broken up into product categories. This can be accomplished in a number of ways. For example, some retailers may choose to use a browse-tree, or product hierarchy, to categorize each product. In a browse-tree, each good or service may belong to a category, or browse node. The browse node may also belong to a parent browse node. For example, a laptop computer product may belong to a laptops browse node, which may be a child of the parent browse node computers, which in turn may be a child of the parent browse node electronics, etc. Additionally, a product may belong to more than one browse node. For example, a digital camera may belong to the browse node cameras as well as to the browse node electronics.

A user interaction with an item 102 may comprise any type of interaction between the user and the item 102. For example, the user may view a website associated with the item, place the item into an electronic shopping cart, place a cursor over the item in a set of search results, or perform any other suitable action in relation to the item. In some embodiments, the item 102 may belong to one or more browse nodes. In other words, the item 102 may be associated with a number of classifications or categories as well as various subcategories.

Additionally, each item available (e.g., offered) in an electronic marketplace may be associated with a number of attributes (also referred to as references). The attributes may be unique to the browse node, or they may be inherited from a parent browse node. For example, a member of the laptop browse node may have a hard_drive_capacity attribute that is inherited from the computer browse node, as well as a screen_size attribute that is not inherited. In general, attributes can be classified into structured attributes and unstructured/semi-structured attributes. Structured attributes are attributes for which the attribute value has a format, such as those that tend to comprise a number followed by a unit type. For example, the attribute hard_drive_capacity is a structured attribute that has a value indicating the number of bytes that a hard drive may store, such as 1000 GB or 1 TB. Unstructured attributes are those that have values that do not follow a format. For example, an item_description attribute may be unstructured because it can contain a number of data in any order. For that reason, structured attributes tend to be more organized, accessible, and machine understandable and thus may be used in many applications, such as indexing in a facet search, comparison shopping, and/or making recommendations. Items from an electronic catalog identified via a search may be filtered based on either structured or unstructured attributes.

Furthermore, attributes may be considered either quantitative or non-quantitative. A quantitative attribute is one that can be measured objectively. One example of a quantitative attribute is capacity (e.g., 1 TB, 2 TB, 4 TB) of an external hard drive. A numbered unit is a quantitative reference that is structured as a number followed by a unit type, such as "15 inches" or "eight feet." A non-quantitative structured reference (NQSR) is one that has a structure but is subjective or cannot be measured objectively. Color (red, green, blue), material (gold, silver, brass), and bed size (single, full, queen, king) are good examples of non-quantitative attributes. Additionally, item attributes that indicate compatibility or those that have binary values (yes or no) may also be non-quantitative.

In some embodiments, the conversation bot 104 may comprise an automated user interaction tool. In some embodiments, the conversation bot may use one or more natural language processing techniques to assess user input and optimize presented items. For example, the conversation bot 104 may identify one or more attributes from user input as well as whether those attributes are viewed in a positive or negative light. The system may use this information assessed by the conversation bot to adjust search parameters to be used by a search engine 110.

In some embodiments, the conversation bot 104 may be executed upon determining that a user is disinterested in an item currently being viewed by the user. For example, upon determining that the user has been viewing a website associated with the item for over a predetermined amount of time, the system may determine that the user has some hesitations about purchasing the item. In another example, the conversation bot may be executed after detecting that the user is perusing item reviews. In some embodiments, the conversation bot may be executed by the user upon activating a button or link.

In some embodiments, the filter data 108 may comprise a number of filters related to attributes associated with items in an electronic catalog. In some embodiments, different types of items may be associated with different types of filters. For example, items falling within the browse node of cameras may be filtered according to a shutter speed attribute, whereas items from other browse nodes may not even be associated with that attribute. Filters may vary even within sub-categories. For example, items falling within the browse node of digital cameras, which may be a subcategory of cameras, may be filtered based on a level of digital zoom for that item. In some embodiments, filters may be associated with a range of values for an attribute. For example, a price attribute may be associated with a number of filters, each having a particular range of values for that attribute. In this example, the price attribute may be associated with filters including <$25, $25-$50, and >$50.

Upon receiving user input 106, the system may identify a number of filters associated with that input. In some scenarios, this may involve the use of one or more natural language processing techniques to map the received input to a relevant filter. Once identified, the relevant filter may be updated (e.g., expanded, shifted, relaxed, removed, or otherwise altered) to produce a new set of filters. In some embodiments, each filter relevant to the item other than the identified filter may remain unchanged. For example, if the item 102 is currently associated with a price range filter indicating between $150-$200, then that price range filter may be added to the new set of filters as is.

In some embodiments, the search engine 110 may be configured to identify a set of items 112 such that each of the items in the set of items 112 shares a number of attributes in common with the item 102 except for those attributes related to the filters that were updated based on user input 106. In some embodiments, the search engine 110 may be operated and/or maintained in relation to an electronic marketplace. For example, the search engine 110 may be configured to execute a query on an electronic catalog in order to identify items within the catalog that are relevant to the executed query.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
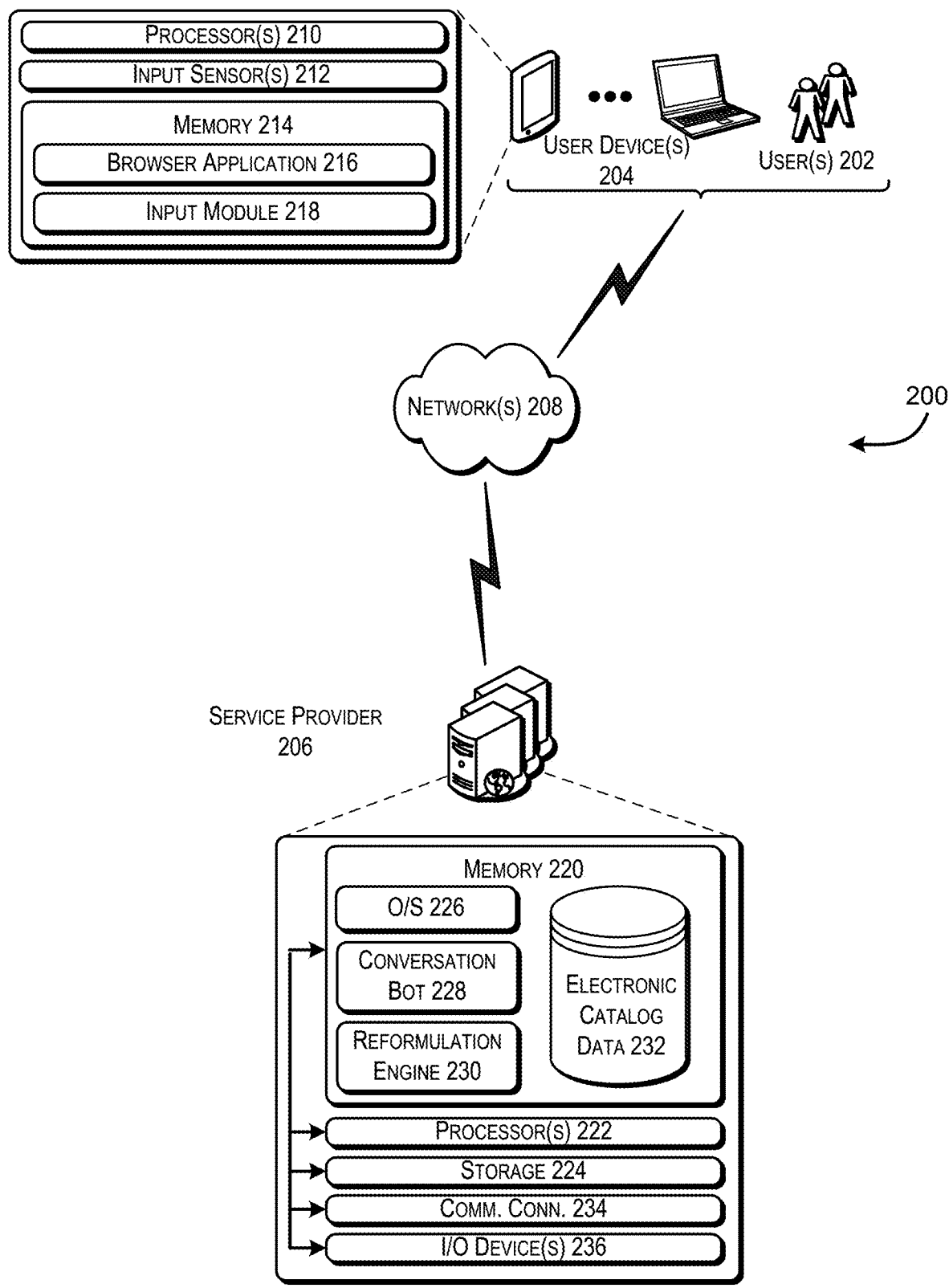
FIG. 2 depicts an illustrative example of a system or architecture in which techniques for providing users with more accurate search results related to items in an electronic catalog may be implemented.

FIG. 2 depicts an illustrative example of a system or architecture 200 in which techniques for providing users with more accurate search results related to items in an electronic catalog may be implemented. In architecture 200, one or more consumers and/or users 202 may utilize user devices 204. In some examples, the user devices 204 may be in communication with a service provider 206 via the network(s) 208, or via other network connections.

The user devices 204 may be any type of computing device such as, but not limited to, a mobile phone, a smart phone, a personal digital assistant (PDA), a laptop computer, a desktop computer, a server computer, a thin-client device, a tablet PC, etc. Additionally, user devices 204 may be any type of wearable technology device, such as a watch, earpiece, glasses, etc. The user device 204 may include one or more processors 210 capable of processing user input. The user device 204 may also include one or more input sensors 212 for receiving user input. As is known in the art, there are a variety of input sensors 212 capable of detecting user input, such as accelerometers, cameras, microphones, etc. The user input obtained by the input sensors may be from a variety of data input types, including, but not limited to, audio data, visual data, or biometric data. Embodiments of the application on the user device 204 may be stored and executed from its memory 214.

Turning to the contents of the memory 214 in more detail, the memory 214 may include a browser application 216. The memory 214 may also include input module 218 capable of obtaining user input via the user device and implementing at least some aspects of the described system. In some embodiments, input module 218 may comprise a widget or add-on application. For example, the input module 218 may comprise a widget that may be implemented in concurrence with the browser application 216 (e.g., upon visiting a particular website). Although sample architecture 200 depicts an input module 218 as being included in the contents of the memory 214 of the user device 204, some embodiments may not include an input module 218 in memory 214 of the user device 204. In those embodiments in which the input module 218 is not included in memory 214, input received by the input sensors 212 may instead be processed by the service provider 206. This will be described in detail below.

As described briefly above, the browser application 216 may allow the users 202 to interact with a service provider 206, such as to store, access, and/or manage data, develop and/or deploy computer applications, and/or interact with web content. The one or more service providers 206, perhaps arranged in a cluster of servers or as a server farm, may be configured to host a website (or combination of websites) viewable via the user device 204 or a web browser accessible by a user device 204 via the browser application 216. Although depicted in memory of the user device 204 in this example, in some embodiments the browser application 216 may be hosted at a server. For example, the user device 204 may be a thin client device capable of accessing a browser application 216 remotely. The browser application 216 may be capable of handling requests from many users 202 and serving, in response, various user interfaces that can be rendered at the user device 204 such as, but not limited to, a web site. The browser application 216 may be any type of application or interface that supports user interaction with a website, including those with user interaction, such as social networking sites, electronic retailers, informational sites, blog sites, search engine sites, news and entertainment sites, and so forth. As discussed above, the described techniques can similarly be implemented outside of the browser application 216, such as with other applications running on the user device 204.

In some embodiments, the input module 218 may be configured to, in conjunction with the processors 210, cause the user device 204 to request input from a user regarding potential attribute variations that may be appropriate for that user. For example, the input module 218 may be configured to display prompts provided by the service provider 206 to the user. The input module 218 may be configured to appear as a messaging application, including an output display and a text input field.

In some examples, the network(s) 208 may include any one or a combination of many different types of networks, such as cable networks, the Internet, wireless networks, cellular networks, and other private and/or public networks. While the illustrated example represents the users 202 accessing the service provider 206 via browser application 216 over the network(s) 208, the described techniques may equally apply in instances where the users 202 interact with a service provider 206 via the user device 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

The service provider 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 206 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider 206 may include at least one memory 220 and one or more processing units (or processor(s)) 222. The processor(s) 222 may be implemented as appropriate in hardware, computer-executable instructions, firmware or combinations thereof. Computer-executable instruction or firmware implementations of the processor(s) 222 may include computer-executable or machine executable instructions written in any suitable programming language to perform the various functions described.

The memory 220 may store program instructions that are loadable and executable on the processor(s) 222, as well as data generated during the execution of these programs. Depending on the configuration and type of service provider 206, the memory 220 may be volatile (such as random access memory (RAM)) and/or non-volatile (such as read-only memory (ROM), flash memory, etc.). The service provider 206 may also include additional storage 224, such as either removable or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 220 may include multiple different types of memory, such as static random access memory (SRAM), dynamic random access memory (DRAM) or ROM. Turning to the contents of the memory 220 in more detail, the memory 220 may include an operating system 226 and one or more application programs or services for implementing the features disclosed herein including at least a module for managing automated interactions with a user (conversation bot 228) and/or a module for reformulating search engine parameters (reformulation engine 230). The memory 220 may also include electronic catalog data 232, which provides information associated with a number of items in an electronic catalog. In some embodiments, the electronic catalog data 232 may be stored in a database.

The memory 220 and the additional storage 224, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 204 or the service provider 206. The service provider 206 may also contain communications connection(s) 234 that allow the service provider 206 to communicate with a stored database, another computing device or server, user terminals, and/or other devices on the network(s) 208. The service provider 206 may also include input/output (I/O) device(s) and/or ports 236, such as for enabling connection with a keyboard, a mouse, a pen, a voice input device, a touch input device, a display, speakers, a printer, etc.

Turning to the contents of the memory 220 in more detail, the memory 220 may include an operating system 226, a database containing electronic catalog data 232 and the one or more application programs or services for implementing the features disclosed herein, including a conversation bot 228 and/or a reformulation engine 230.

In some embodiments, the conversation bot 228 may be configured to optimally obtain input from a user and analyze that input in order to determine user needs. In some embodiments, the conversation bot may use one or more natural language processing techniques to identify attributes mentioned by the user as well as a context in which those attributes are mentioned. For example, the conversation bot may identify an attribute and whether that attribute is considered positive or negative. In another example, context may be assessed to determine whether the attribute is relevant to the item being viewed or another item. For example, natural language processing may be used to determine that a phrase such as "too expensive," "cost(s) too much," or "want something cheaper" refers to a price attribute. The conversation bot may also determine a context by analyzing the words around this phrase. For example, if the phrase follows "this item," then the conversation bot may determine that the price attribute of the currently viewed item is too high and should be updated when a new search is performed. In contrast, if the phrase follows "other items," then the conversation bot may determine that the price attribute of the currently viewed item is appropriate and should remain the same when a new search is performed. The conversation bot may be configured to process received user input and communicate that user input to the reformulation engine 230.

In some embodiments, the reformulation engine 230 may be configured to receive user input from the conversation bot 228, identify one or more attribute values associated with an item, and reformulate search engine parameters based on the identified attributes. In some embodiments, the reformulation engine 230 may receive an indication of one or more attributes identified by the conversation bot 228 as well as an indication as to how parameters of a search should be adjusted for those parameters. The reformulation engine 230 may generate a set of filters that may be provided to a search engine as a set of parameters to be used in a search. For example, the reformulation engine 230 may initially identify each of the filters that are currently associated with an item that is being viewed. Upon receiving input from the conversation bot that one or more attributes should be adjusted, the reformulation engine 230 may adjust the filters associated with those attributes as indicated by the conversation bot 228 to generate a new set of filters. This new set of filters comprises each of the previously applied filters, but the filters associated with the indicated attributes is replaced with the appropriate filter. For example, upon receiving an indication that the prices attribute should be lower, the reformulation engine 230 may identify the price filter associated with the currently viewed item, and either replace it with a price filter having a lower range of values or adjust the range of values in the current filter. In some embodiments, general preferences may be stored in association with each filter/attribute. For example, in general, people prefer a lower price to a higher price. Accordingly, if the reformulation engine 230 receives an indication that the user does not like the price, it may default to choosing a more preferred range of values (in this case a lower price).

Figure 3:
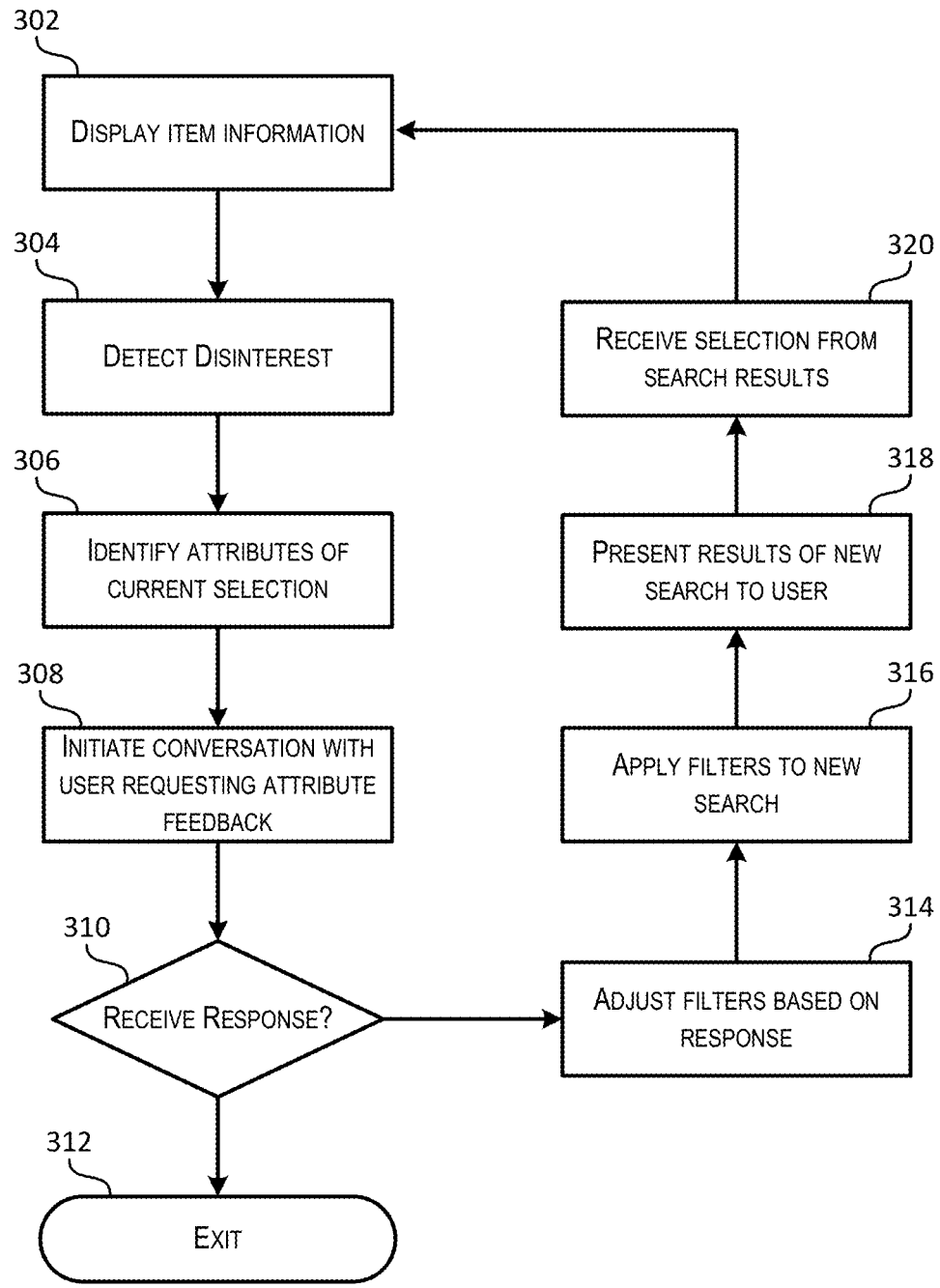
FIG. 3 depicts a flow chart illustrating an example process for optimizing presentation of items based on automated user interactions in accordance with at least some embodiments.

FIG. 3 depicts a flow chart illustrating an example process for optimizing presentation of items based on automated user interactions in accordance with at least some embodiments. The process 300 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 300 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 300 of FIG. 3 may be performed by at least the one or more service providers 206 shown in FIG. 2. The code may be stored on a computer-readable storage medium, for example, in the form of a computer program including a plurality of instructions executable by one or more processors. The computer-readable storage medium may be non-transitory.

Process 300 may begin at 302, when information related to an item in an electronic catalog is presented to a user. In some embodiments, the user may navigate to a webpage associated with an item by clicking on a link. For example, the user may, when searching for a particular item or type of item, use a search engine. Upon being presented a number of results by the search engine, the user may select one of the items from the results by clicking on a link associated with that item. The information displayed to the user may include any number of attributes associated with the item, including price, availability, shipping information, and any other suitable attribute of the item.

In some embodiments, the service provider may detect a level of interest for the user that is viewing the information related to the item. For example, a user that places the item into a virtual shopping cart may be determined to be interested in the item. At 304, the service provider may detect disinterest in the item. For example, the user may remove the item from a virtual shopping cart, peruse negative reviews of the item, or view a website associated with the item for an amount of time greater than a threshold amount of time. In some embodiments, disinterest in an item may be detected when a user navigates away from a webpage associated with the item (e.g., clicks on another link or clicks on the back button).

At 306, the service provider may identify a number of attributes associated with the item for which information is currently displayed. In some embodiments, these attributes may include attributes specific to a particular browse node or category. In some embodiments, the attributes may include a combination of attributes specific to particular browse nodes as well as attributes common to every item in an electronic catalog (e.g., price, availability, etc.). In some embodiments, attribute values may be determined for a particular item in an electronic catalog from structured and/or unstructured text associated with that item. In some embodiments, types of attributes to be associated with a particular item or category may be determined from text associated with the item. Some examples of such techniques are described in Viswanathan et. al., "EXTRACTING PRODUCT FACETS FROM UNSTRUCTURED DATA," U.S. application Ser. No. 14/866,694, filed Sep. 25, 2015, which is hereby incorporated into the current disclosure by reference. Wu et al., "ATTRIBUTE FILL USING TEXT EXTRACTION," U.S. application Ser. No. 14/314,962, filed Jun. 25, 2014 discloses another example of an attribute identification process and is also hereby incorporated into the current disclosure by reference.

At 308, a conversation may be initiated with the user to determine what attributes should be updated to optimize item selection. In some embodiments, the conversation may be initiated using a conversation bot. The conversation bot may utilize a GUI that includes at least a display area as well as a user input field. The conversation bot may initiate a conversation with the user in order to identify the attributes that the user does or does not like about the item currently being viewed. For example, the conversation bot may ask the user about specific attributes of the item to obtain the user's sentiment regarding those attributes.

At 310, the service provider may await a response from the user. If no response is received, then the service provider may exit the conversation at 312 after a predetermined amount of time or may continue to monitor for a response from the user. A response received from a user may include any combination of structured and/or unstructured input. For example, the response may include text, a selection of one or more presented options, or any other suitable means for identifying attributes. The input may positively or negatively identify attributes in embodiments. For example, the user may specify attributes of the currently selected item that the user would like to remain the same, attributes of the currently selected item that the user would like to alter, or some combination of the two. In some embodiments, one or more natural language processing techniques may be used to identify one or more attributes in relation to the received response.

At 314, the service provider may identify one or more filters associated with attributes identified in the user response to be adjusted. In some embodiments, a filter associated with each attribute may be associated with multiple ranges of values. The service provider may identify, for each filter associated with an attribute of the item, a range of values associated with the item based on a value of the attribute. In some embodiments, a filter associated with an attribute may be associated with a fixed or specific value. The service provider may identify each filter associated with a specific value in this manner. Once a current set of filters has been identified, the service provider may edit or update those filters based on the received user input. For example, for each filter associated with an attribute identified in the user input by the conversation bot (e.g., using language processing) may be adjusted (e.g., upward or downward) based on that input. For example, if the user remarks "the capacity is great, but the cost is too high," then the filter associated with the capacity attribute will remain the same, whereas the filter associated with the price attribute will be adjusted to cover a lower range of values.

At 316, the adjusted filters may be provided as search parameters to a search engine associated with the electronic catalog. In some embodiments, the search engine may be executed via a function call. In these embodiments, the filter values may be passed to the search engine as method call parameters.

At 318, upon execution of the search engine using the provided search parameters, the conversation bot may present the user with a new set of search results. In some embodiments, the conversation bot may be configured to identify the top X results, where X is some predetermined number of results. For example, upon execution of the search engine, the conversation bot may present only the most relevant search result returned by the search engine. In some embodiments, the search results may be presented within a display window of the conversation bot. In some embodiments, the search results may be presented in a manner consistent with the manner in which the user input was provided. For example, upon receiving a user input of "I like the material that this slow cooker is made of, but I need a larger volume," the conversation bot may respond "This search_item is also made of stainless steel, but has a volume of 8 quarts." In this example, search_item may represent a reference (e.g., a uniform resource locator (URL)) to the most relevant search result item (e.g., slow cooker) returned by the search engine.

At 320, the service provider may receive a selection of one or more of the search results. For example, the user may select or click on one of the presented search results. In some embodiments, one or more machine learning algorithms may be used to improve search results. In these embodiments, a selection of a search result by a user may provide feedback to the machine learning algorithm. Upon selection of an item from the search results, the user may be directed to a webpage associated with the selected item and the process 300 may then be repeated by returning to 302.

Figure 4:
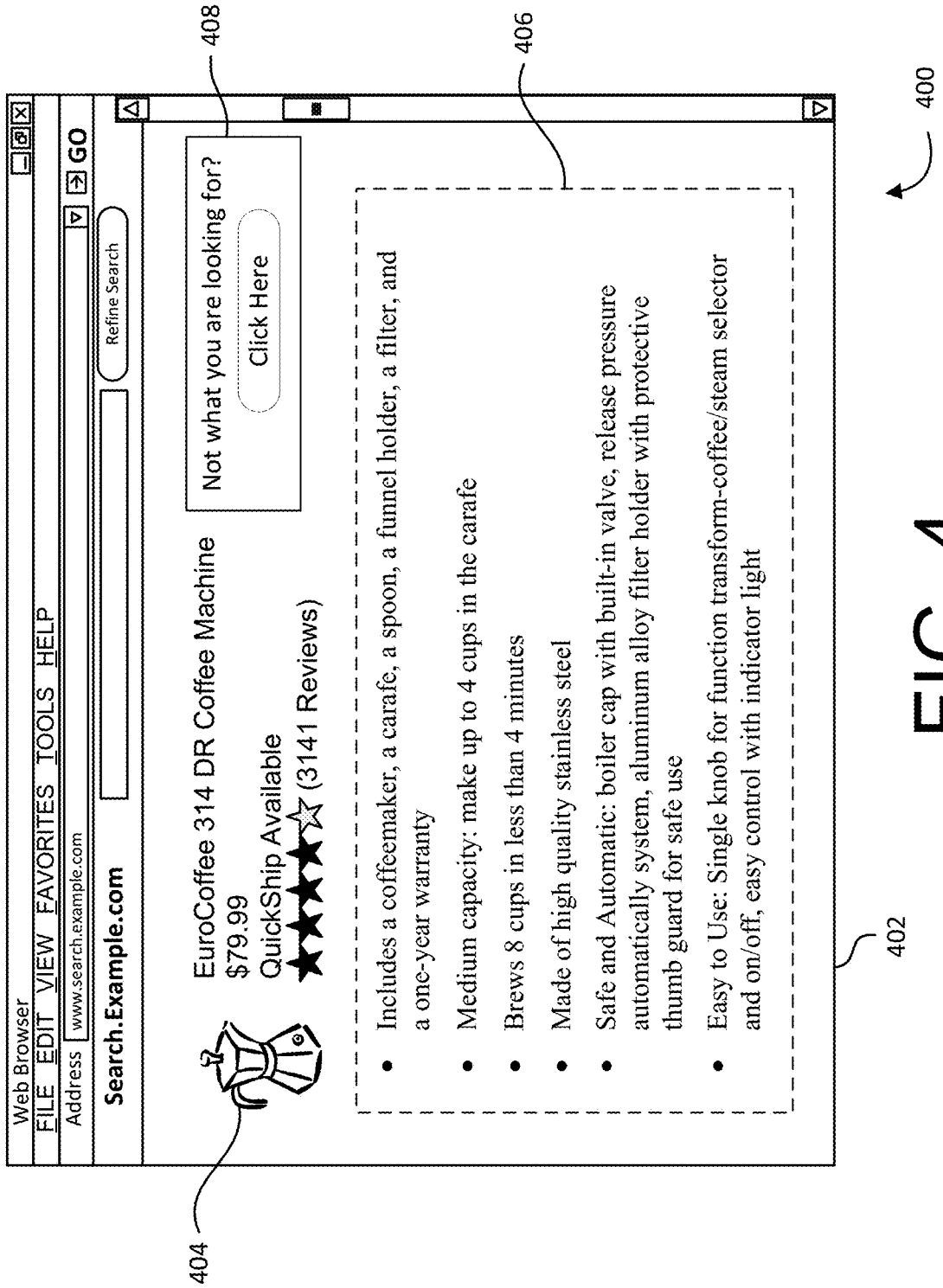
FIG. 4 depicts an illustration of a graphical user interface (GUI) in which embodiments of the disclosure may be implemented.

FIG. 4 depicts an illustration of a graphical user interface (GUI) in which embodiments of the disclosure may be implemented. In FIG. 4, a webpage 402 is depicted. Webpage 402 is an item webpage which is dedicated to an item 404 and represents a webpage for a catalog entry in an electronic catalog. In some embodiments, the webpage 402 may include a number of attributes associated with the item. The attributes may be stored as values in fields of one or more databases. In some embodiments, at least some of the attributes may be specific to a browse node or category of item.

In some embodiments, at least some of the attributes 406 of the item may be displayed as structured text. For example, a value associated with the price attribute may be presented as a unit of currency followed by a numerical value. In some embodiments, one or more attribute values may be presented as unstructured data. Attribute values may be entered by an administrator of an electronic marketplace or they may be provided by a third party (e.g., a seller or manufacturer). In some embodiments, various attribute values for an item may be presented in a fixed location of the webpage. For example, an item's price may always be displayed in the same location, or in the same relative location, for each item in the electronic marketplace.

In some embodiments, a mechanism 408 may be presented to enable activation of a conversation bot on webpage 402. The mechanism 408 may be any suitable means of initiating execution of the conversation bot. For example, the mechanism 408 may comprise a button, a link (e.g., a URL), a chat window, or any other suitable activation means. In some embodiments, the mechanism 408 may be displayed on webpage 402 upon detecting disinterest by the user in the current webpage. For example, the mechanism 408 may be displayed upon determining that no action has taken place with respect to the webpage 402 within a predetermined amount of time. In some embodiments, the mechanism 408 may be present on each webpage 402 for each item in the electronic catalog, such that the user's activation of the mechanism serves as an indication of disinterest by the user.

Figure 5:
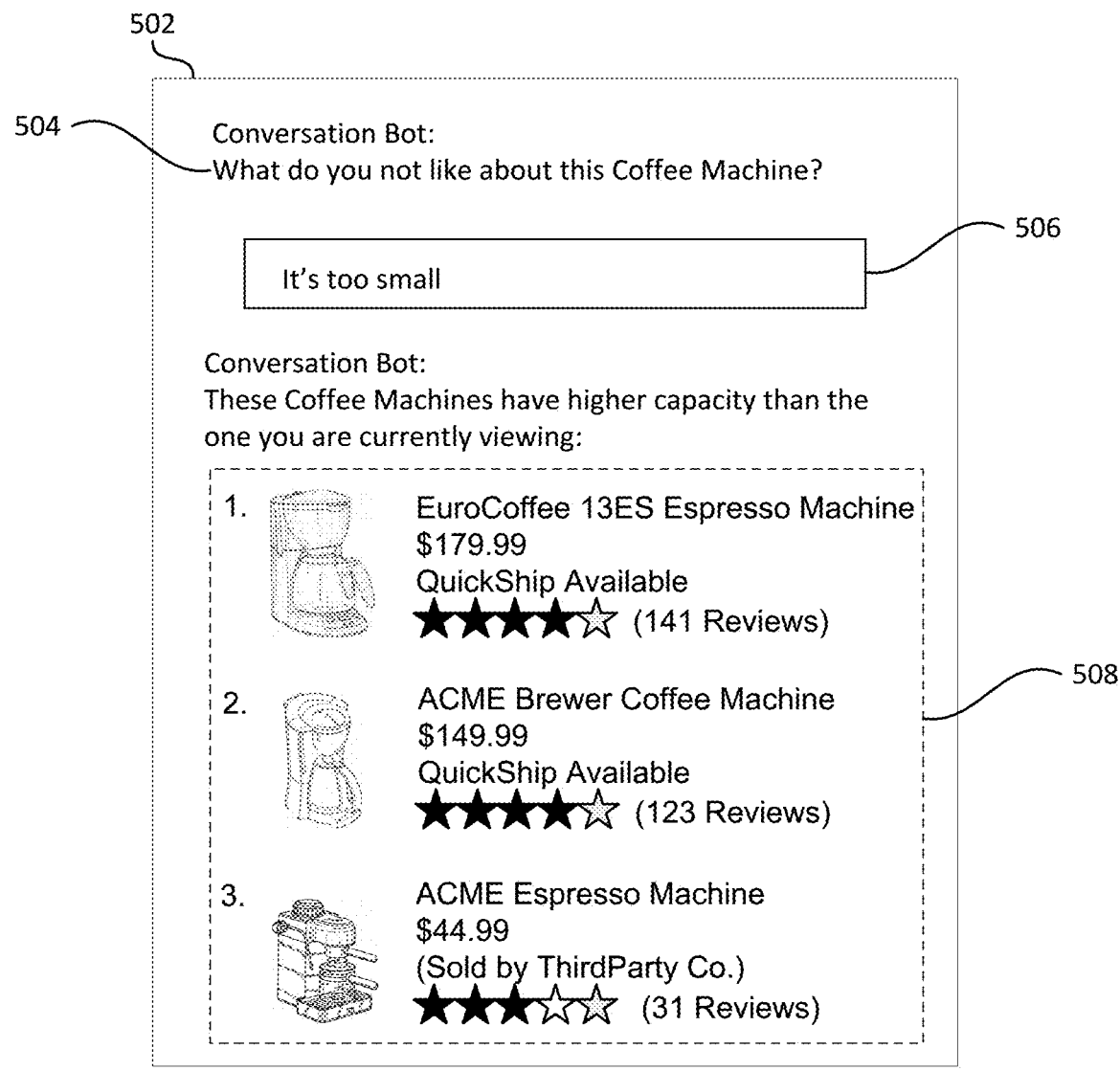
FIG. 5 depicts a first example interaction between an automated conversation bot and a user of an electronic catalog.

FIG. 5 depicts a first example interaction between an automated conversation bot and a user of an electronic catalog. In FIG. 5, a conversation window 502 may be presented to a user upon execution of a conversation bot in order to obtain input from the user and provide recommendations. Conversation window 502 may comprise at least a display area for providing information to a user and an input field for obtaining input from the user.

In conversation window 502, the conversation bot may provide an initial prompt 504 to the user to solicit user input. In some embodiments, the prompt 504 may solicit user input related to attribute values that should be updated (e.g., those attribute values of the item that the user does not like). In some embodiments, the prompt 504 may solicit user input related to attributes that should not be updated (e.g., those attribute values of the item that the user does like). In some embodiments, the prompt 504 may solicit user input related to a combination of attributes that should not be updated and attributes that should be updated.

As depicted, the conversation window 502 may include an input field 506 that enables a user to provide some sort of user input. In conversation window 502, the conversation bot may allow a user to provide free form text (e.g., unstructured input). In embodiments, that allow a user to provide unstructured input, the conversation bot may use one or more natural language processing techniques to analyze the received input. In some embodiments, the natural language processing techniques may be used in conjunction with one or more machine learning techniques to improve natural language processing algorithms. This may enable the service provider to identify language patterns used with respect to various items in the electronic marketplace in order to improve the natural language processing techniques.

Once user input is received via the input field 506, the conversation bot may analyze the received input to identify attributes associated with that input. For example, the conversation bot may identify the attributes of the item that are most closely matched to the received user input. Additionally, the conversation bot may analyze a sentiment with which the user input is provided to determine how an attribute should be effected. Once this determination has been made, the filter associated with that attribute may be adjusted. For example, upon determining that the user referred to the price attribute and indicated that it was too high, the service provider may identify a filter range that is currently associated with the item, determine an appropriate lower filter range, and apply that new filter range. In this example, the service provider may select a filter range that is one filter range lower than the current filter range, a filter range that represents the entirety of values below the current filter range, or any other suitable range of values.

Once range values have been updated in a set of filters, the set of filters may be provided to a search engine to return one or more item results. In this way, the search engine may return a number of search results that are similar to the item currently being viewed by the user, but vary from that item in ways that the user finds appealing. This enables the search engine to provide more relevant results with less input from the user. As depicted, the conversation window may be used to present a number of search results 508 returned by the search engine. At least some attribute values associated with each of the search results may be presented alongside the item. In some embodiments, values associated with the attributes identified from the user input may be presented alongside the search results. For example, if the user indicates that he or she is looking for an item with a higher price than the one that is currently being viewed, then the price of each of the search results may be displayed alongside each of those search results. This allows the user to quickly determine whether the search result items meet his or her needs.

In some embodiments, the conversation bot may provide an indication of how well the user's interests are met by the presented set of items as indicated by how well the item matches the set of filters generated. For example, the conversation bot may point out "this item is less expensive than the item that you were just looking at, but it is not available in the color that you were looking for." In some embodiments, multiple comparisons may be made by the conversation bot. For example, the conversation bot may point out how well various items in the set of returned items meet or do not meet the user's interests. Additionally, it should be noted that what is depicted in the figures is a simplified example of embodiments. In some embodiments, the conversation bot may engage the user in a much more complex conversation. For example, the conversation bot may ask multiple questions or provide multiple sets of items for the user's consideration.

It should be noted that although the conversation bot is depicted in each of the figures as being implemented visually, this is done to show certain capabilities of the conversation bot and is not meant to be limiting. However, one skilled in the art would easily recognize that several embodiments of the disclosure would be achievable. For example, in some embodiments the disclosure may take the form of an audio presentation device capable of receiving a user's voice input and providing audio prompts. In this example, a user may ask the audio presentation device about a particular item or category of items. The user may then indicate that the item is not what he or she is looking for. By way of illustration, the user may say "what other items are available?" Upon receiving this indication, the audio presentation device may proceed to ask the user what she does or does not like about the presented product. Once the user has responded, the conversation bot may adjust the appropriate filters and audibly present information related to a number of available items for the user's consideration.

In another illustrative example, the conversation bot may be implemented across multiple devices. For example, the conversation bot may prompt a user for input, and receive input, via a first device and may present a set of options via a second device. In this example, an audio presentation device may be in communication with a display device (e.g., a connected television). The user may view information related to an item on the connected television. The user may, upon viewing the information, initiate a conversation with the audio presentation device by requesting to view another item. In this example, the audio presentation device may converse with the user to identify filters that are appropriate to alter, identify a set of items that corresponds to that set of altered filters, and cause the set of items to be displayed on the connected television. The conversation bot may continue to converse with the user to further refine the set of items presented on the connected television.

In some embodiments, the system may be configured to receive input regarding the conversation bot in order to improve future user interactions. This may cause the system to update settings associated with that user that are used to determine how much a filter should be adjusted based on user input. For example, the conversation bot, upon presenting an item or set of items that are less costly than an item previously viewed by the user, may receive input such as "still too expensive." In this example, the conversation bot may update user-specific settings to indicate that a filter associated with cost should be adjusted more dramatically in the future when that user indicates that a price is too high. In some embodiments, the system may store an indication of a sentiment or meaning that is specific to a particular user. For example, "lightweight" may mean below an item's average weight for one user, whereas it may mean at least 20% below the item's average weight for another user.

Figure 6:
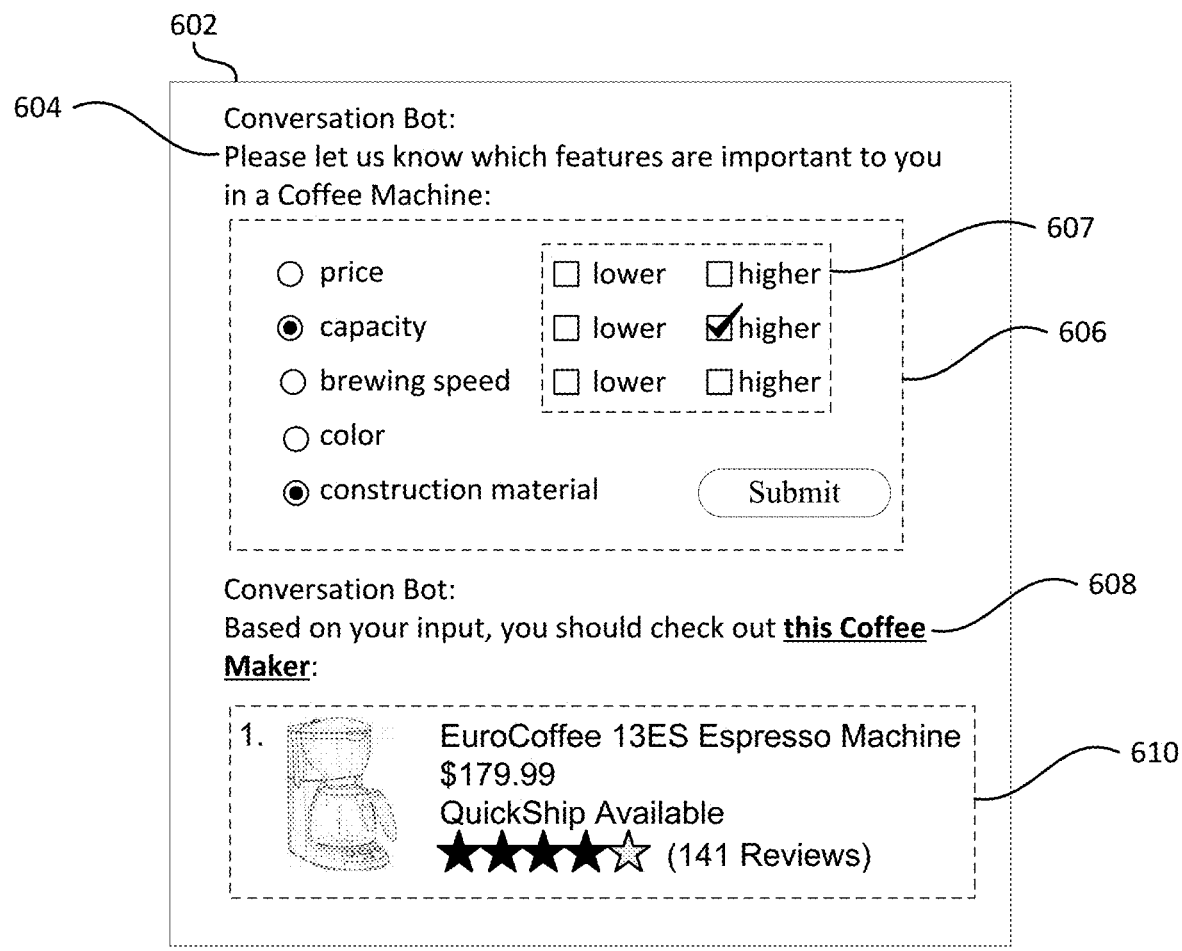
FIG. 6 depicts a second example interaction between an automated conversation bot and a user of an electronic catalog.

FIG. 6 depicts a second example interaction between an automated conversation bot and a user of an electronic catalog. In FIG. 6, a conversation window 602 may be presented to a user upon execution of a conversation bot in order to obtain input from the user and provide recommendations. Similar to that of FIG. 5, conversation window 602 may comprise at least a display area for providing information to a user and an input field for obtaining input from the user.

In conversation window 602, the conversation bot may provide an initial prompt 604 to the user to solicit user input. In some embodiments, the prompt 604 may include a selection input field 606 that includes a number of attributes that may be selected. For example, the conversation bot may present a number of predetermined attributes associated with the item for selection by a user (e.g., structured input). Additionally, the selection input field 606 may include some way for the user to indicate a way in which the filter associated with the attribute should be adjusted. As described above, each of the presented attributes may be associated with a filter. Based on the received user input, the filters associated with each selected attribute may be adjusted or updated based on the input received via that selection input field 606.

In some embodiments, a selection input field 606 may also include an adjustment indicator 607. For example, in addition to providing a means to select which attributes should be adjusted, the prompt 604 may also provide a means for indicating how those attributes should be adjusted. In this example (as depicted) the selection input field 606 may include an adjustment indicator 607 that may be selected to indicate that the attribute should be adjusted downward, an adjustment indicator 607 that may be selected to indicate that the attribute should be adjusted upward, or both adjustment indicators 607.

In some embodiments, the search engine, when provided with the new filter data based on the received input, may return a limited number of search results. For example, the search engine may return only the most relevant result from the conducted search. In some embodiments, the search result may be presented as a link 608 within a response provided by the conversation bot. For example, the conversation bot may provide a response in which it recommends that the user take a look at the item within the link 608. In some embodiments, the search results may be presented in a list 610, wherein the item is depicted alongside one or more attribute values of that item. In some cases, the one or more attribute values of the item that are displayed may include the values of the attributes that the user identified via the selection input field 606.

Figure 7:
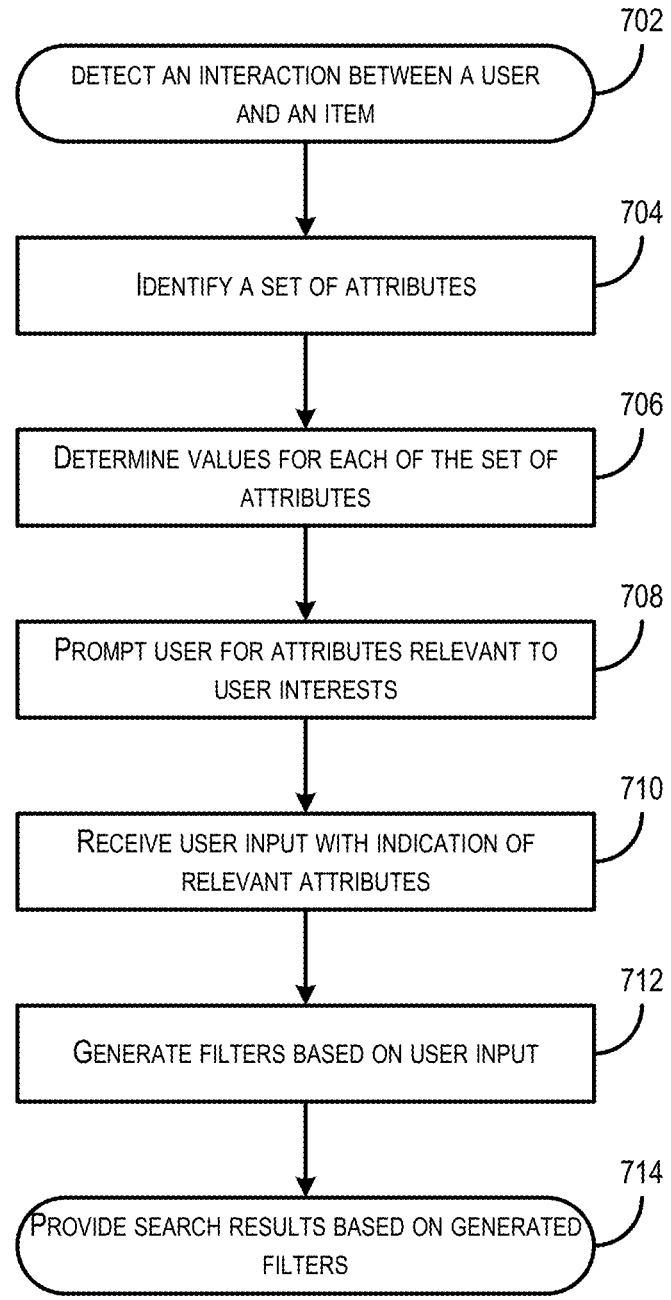
FIG. 7 depicts a flow diagram illustrating a process for identifying and providing catalog entries using a conversation bot in accordance with at least some embodiments.

FIG. 7 depicts a flow diagram illustrating a process for identifying and providing catalog entries using a conversation bot in accordance with at least some embodiments. In accordance with at least some embodiments, process 700 may be implemented by a service provider. The service provider may be an example service provider 206 depicted in FIG. 2.

Process 700 may begin at 702, when an interaction is detected between a user and an item. In some embodiments, the interaction may comprise one or more of a number of different types of interactions related to the item. For example, the interaction may comprise adding or removing an item from a virtual shopping cart, viewing a webpage associated with the item, viewing item ratings or reviews, hovering over the item in a list of search results, or any other suitable interaction with the item. In some embodiments, the interaction may be detected by monitoring clickstream data, or other user data associated with user actions, for a user stored on a webpage server (e.g., by analyzing server logs). In some embodiments, a user's interactions may be monitored in real-time (as they occur).

At 704, the service provider may identify a set of attributes associated with the item. For example, the service provider may query a database entry within an electronic catalog to identify a number of attributes (also referred to as facets) associated with an item in the electronic catalog. In some embodiments, the item may have columns or rows dedicated to particular attributes within a database table.

At 706, the service provider may determine a number of values for each of the set of attributes associated with the item. In some embodiments, the values for the set of attributes may comprise values stored in database fields within a database entry associated with the item.

At 708, the service provider may prompt the user for an indication of attributes that are relevant to the user's interests. In some embodiments, this may occur once the user has initiated a search reformulation process. For example, the user may click on a button displayed on a webpage for the item in order to initiate the search reformulation process. In some embodiments, the prompt may be provided to the user via a conversation bot and may include a request to the user for attributes that the user does like, attributes that the user does not like, or a combination of attributes that the user does and does not like.

At 710, the service provider may receive a response from the user with the indication of the attributes. In some embodiments, the user may be provided the ability to enter unstructured text in response to the prompt (e.g., via a text input field). In some embodiments, the user may be provided with the ability to enter a structured response. For example, the user may be asked to select on or more attributes from the set of attributes determined to associated with the item. By way of illustration, the user may be able to select a number of attributes using radio buttons or checkboxes. In some embodiments, the user may also be prompted for a way in which the attributes should be altered or updated. For example, the user may indicate that a value for a capacity attribute associated with an item is too high, which would indicate that the capacity attribute should have a value that is lower than the current capacity attribute.

In some embodiments, a weight may be assigned to one or more attributes based on the received response. For example, one or more attributes may be assigned a higher weight, (e.g., importance) than one or more other attributes of the item. In this example, a range associated with one or more filters may be updated based on the determined weight. By way of example, if the response received from the user indicates "I need a lot of memory, but I would also like a good price," then the service provider may determine that the memory attribute is more important than the price attribute. In this example, the service provider may update filters such that the price attribute is given greater leeway than the memory attribute. In some embodiments, the service provider may determine that one or more attribute values is more suited to a user's interests than another. The service provider may adjust a range for various filters based on that determination. For example, if the service provider receives the input that "the price is good, and the memory is great . . . ," then the service provider may expand a filter associated with the price attribute by a greater amount than it expands filters associated with the memory attribute. To expand a filter, the service provider may increase a current range of values for the filter. For example, if the current filter results in items returned by a search engine between $30 and $50, then this filter may be expanded to result in items returned by a search engine between $20 and $60.

At 712, the service provider may generate or update a set of filters based on the received response. Each filter in the set of filters may be associated with an attribute of the set of attributes determined for the item. In some embodiments, the filters may include a value or a range of values. For example, a USB memory drive may be associated with a memory capacity attribute. In this example, filters associated with the attribute may be broken into ranges, such as 0-1 GB, 1-25 GB, 25-100 GB, >100 GB. In some embodiments, the service provider may identify a current range associated with a value of the attribute of the item and adjust that range. For example, in embodiments in which the user indicates that he or she does not like the value associated with Attribute A, the filter associated with Attribute A may be adjusted such that a range associated with the value is adjusted upward or downward. In some embodiments, a filter may be relaxed, such that the range associated with an attribute may be expanded or broadened. For example, in a scenario in which the user indicates that he or she does like a particular attribute, filters associated with each of the attributes that were not indicated may be expanded.

In embodiments in which the user is able to provide unstructured data, the service provider may first use one or more language processing techniques to map elements of the response to one or more attributes. In some embodiments, the service provider may also determine a sentiment associated with those attributes. For example, the service provider may determine whether the user views a value for the attribute for the item in a positive or negative light. Based on this analysis, the service provider may determine how the attribute should be adjusted. In some embodiments, the service provider may store an indication of general preferences related to one or more attributes. For example, the service provider may store an indication with respect to a memory_capacity attribute that indicates that a higher values is generally preferable to a lower value. In this example, if the user indicates that he or she is not happy with the memory_capacity attribute, the filter associated with the memory_capacity attribute may be updated to include a range of values that is greater than the current memory_capacity attribute value.

At 714, the service provider may provide search results based on the filters. In some embodiments, the updated set of filters may be provided as parameters to a search engine. The search engine may be associated with the electronic catalog which is also associated with the item currently being viewed. According to embodiments, of the disclosure, the results returned by the search engine using the updated set of filters should share similar attribute values to the item currently being viewed with regard to any attributes that the user has indicated are ok. The results returned by the search engine using the updated set of filters should also vary from the item currently viewed in relation to attribute values that the user has indicated are unsatisfactory. In some embodiments, the search engine may give more or less weight to various attributes or filters based on the response received from the user. For example, if the user indicates that a first attribute is more important than a second attribute, then a range associated with the second attribute may be expanded by a larger amount than the range of the first attribute.

Embodiments of the disclosure provide for a number of technical advantages over prior art systems. For example, the use of a conversation bot in this manner allows user to find items similar to those currently being viewed with any differences resulting from the attributes of the item that the user finds unappealing. Accordingly, the described techniques represent an improvement over conventional electronic marketplace search systems in that it provides for a way to present more relevant search results to a user while requiring less input from that user. This can result in a higher level of engagement with the user, which can subsequently result in fewer lost sales and higher profits. Furthermore, this system is entirely automated, which enables an operator of an electronic marketplace (or other suitable entity) to take advantage of the described additional functionality without incurring additional overhead costs. Additionally, in some embodiments, values associated with the attributes identified from the user input may be presented alongside the search results by the conversation bot. This allows the user to quickly see attribute values important to that user and determine whether the search result items meet the user's needs.

Figure 8:
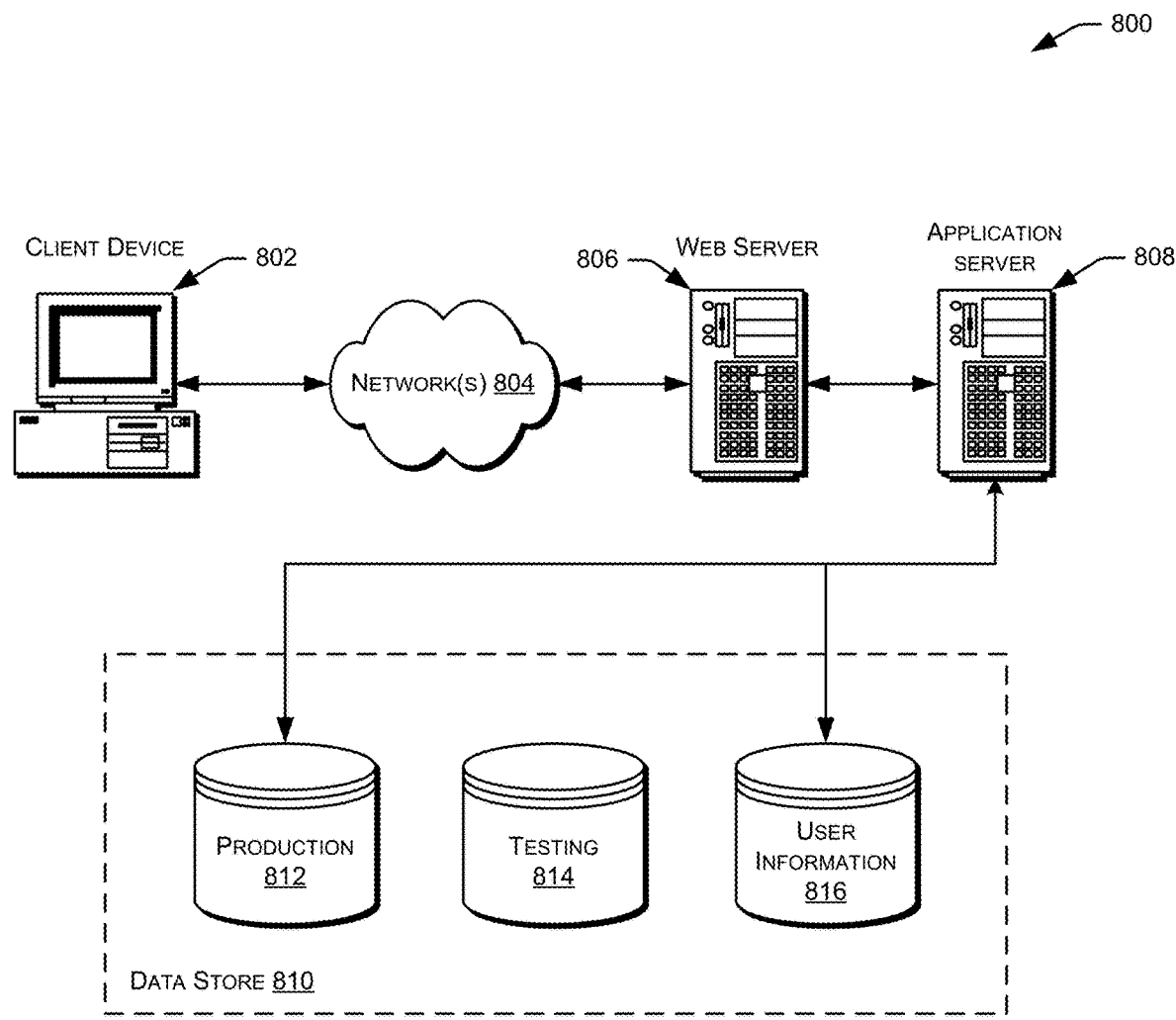
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   detecting, via a user interface, an interaction between a user and an item;
   identifying an attribute associated with the item;
   determining a value of the attribute associated with the item;
   receiving, from the user, user input comprising unstructured data;
   identifying, utilizing a language processing technique, that the unstructured data indicates a sentiment corresponding to the attribute of the item;
   identifying a range of values for a search parameter based at least in part on the value of the attribute associated with the item and the sentiment identified from the unstructured data;
   generating a set of search parameters to include the range of values of the search parameter;
   executing a search using the set of search parameters to identify a set of search results; and
   providing the set of search results to the user.

2. The computer-implemented method of claim 1, further comprising prompting the user to provide the unstructured data, wherein prompting the user to provide the unstructured data comprises initiating a conversation bot.

3. The computer-implemented method of claim 2, the conversation bot comprises at least a display area and a user input field.

4. The computer-implemented method of claim 2, wherein prompting the user to provide the unstructured data occurs in response to determining the user has viewed the item over a threshold period of time.

5. The computer-implemented method of claim 1, wherein the sentiment is positive or negative.

6. A system comprising:
   a processor; and
   a memory including instructions that, when executed with the processor, cause the system to, at least:
   detect, via a user interface, an interaction between a user and an item;
   identify an attribute associated with the item;
   determine a value of the attribute associated with the item;
   receive, from the user, user input comprising unstructured data;
   identify, utilizing a language processing technique, that the unstructured data indicates a sentiment corresponding to an attribute of the item;
   identify a range of values for a search parameter based at least in part on the value of the attribute associated with the item and the sentiment identified from the unstructured data;
   generate a set of search parameters to include the range of values of the search parameter;
   execute a search using the set of search parameters to identify a set of search results; and
   provide the set of search results to the user.

7. The system of claim 6, wherein the range of values of the search parameter is updated based on the value of the attribute associated with the item.

8. The system of claim 6, wherein the attribute is one of a set of attributes associated with the item, wherein one or more attributes in the set of attributes is assigned a weight.

9. The system of claim 8, wherein the range of values of the search parameter is updated based on a weight assigned to the attribute corresponding to the search parameter.

10. The system of claim 6, the executing the instructions further causes the system to obtain an indication of one or more attributes that are of interest to the user from a set of attributes associated with the item, wherein the indication of one or more attributes from the set of attributes comprises a selection from a list including the set of attributes.

11. The system of claim 6, wherein the search parameter is one of a set of search parameters, and wherein remaining search parameters of the set of search parameters remain unchanged, the remaining search parameters being different from the search parameter corresponding to the attribute of the item.

12. A non-transitory computer readable medium storing specific computer-executable instructions that, when executed by a processor, cause a computer system to at least:
   detect, via a user interface, an interaction between a user and an item;
   identifying an attribute associated with the item;
   determining a value of the attribute associated with the item;
   receive, from the user, user input comprising unstructured data;
   identify, utilizing a language processing technique, that the unstructured data indicates a sentiment corresponding to the attribute of the item;

identify a range of values for a search parameter based at least in part on the value of the attribute associated with the item and the sentiment identified from the unstructured data;

generate a set of search parameters to include the range of values of the search parameter;

execute a search using the set of search parameters to identify a set of search results; and provide the set of search results to the user.

13. The non-transitory computer readable medium of claim 12, wherein the user input is received as input to a conversation bot, the conversation bot comprising at least a display area and a user input field.

14. The non-transitory computer readable medium of claim 12, wherein the set of search parameters is based on the sentiment identified from the unstructured data.

15. The non-transitory computer readable medium of claim 12, wherein detecting the interaction between the user and the item comprises receiving information indicating that the user is viewing product information associated with the item.

16. The non-transitory computer readable medium of claim 12, wherein the user is prompted for the user input.

17. The non-transitory computer readable medium of claim 16, wherein the user is prompted after a predetermined amount of time.

* * * * *

UNITED STATES PATENT AND TRADEMARK OFFICE
CERTIFICATE OF CORRECTION

PATENT NO. : 10,558,693 B1
APPLICATION NO. : 15/451161
DATED : February 11, 2020
INVENTOR(S) : Brian Elieson, Karthik Krishnamurthy and Aneeb Naveed Qureshi Page 1 of 1

It is certified that error appears in the above-identified patent and that said Letters Patent is hereby corrected as shown below:

In the Claims

Column 22, Line 41, Claim 10:
Delete "10. The system of claim 6, the executing the instructions"
Insert --10. The system of claim 6, wherein executing the instructions--

Signed and Sealed this
Twelfth Day of May, 2020

Andrei Iancu
*Director of the United States Patent and Trademark Office*